R. B. Perkins,

Spoon.

No. 2,258. Reissued May 29, 1866.

Witnesses
Wm. H. Harrison
E. Kemysmith

Inventor.
Russell B. Perkins
by A. Bleakley atty

N. PETERS, PHOTO-LITHOGRAPHER, WASHINGTON, D. C.

UNITED STATES PATENT OFFICE.

CHARLES PARKER AND RUSSELL B. PERKINS, OF MERIDEN, CONNECTICUT, ASSIGNEES OF RUSSELL B. PERKINS.

IMPROVEMENT IN THE MANUFACTURE OF SPOONS.

Specification forming part of Letters Patent No. 34,863, dated April 1, 1862; Reissue No. 2,258, dated May 29, 1866.

*To all whom it may concern:*

Be it known that RUSSELL B. PERKINS, of Meriden, in the county of New Haven and State of Connecticut, has invented a new and useful Improvement in the Manufacture of Spoons; and we, the assignees of the said RUSSELL B. PERKINS, do hereby declare the following, when taken in connection with the accompanying drawings and the letters of reference marked thereon, to be a full, clear, and exact description of the same, and which said drawings constitute part of this specification, and represent, in—

Figure 1:
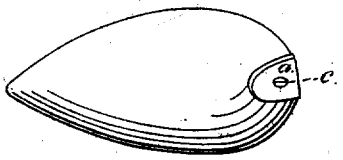
Figure 2:
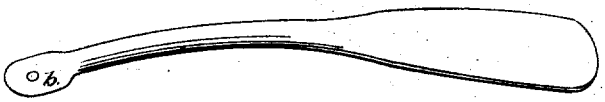

Figure 1, a perspective view of the bowl as formed to receive the handle; Fig. 2, a perspective view of the handle as formed to be attached to the bowl, and in Fig. 3 a central section of the bowl and handle united.

This invention relates to an improvement in the manufacture of that class of iron spoons in which the bowl and the handle are struck up from separate pieces of plate metal and afterward united by means of riveting, in connection with soldering of the contiguous surfaces by the act of tinning.

Heretofore the bowl has been formed from a piece of tin-plate struck into the exact shape required when finished and the handle of iron plate. The two surfaces of the handle and bowl which are to come together are then tinned, after which the handle and bowl are placed together and riveted, so that when the whole spoon is tinned the two surfaces in contact become united by the flowing of the tin in the tinning-bath. The bowl of the spoon thus constructed, if made as light as desirable, easily bends at the junction of the bowl and handle, that being the weakest portion of the spoon which should in fact be the strongest.

The object of this improvement is to give greater strength to the bowl of the spoon at that point where the greatest resistance is required, and also to affix the handle more securely; and that by this improvement this object is accomplished will be apparent from the following description of the construction, which is made in order to enable others skilled in the art to manufacture such improved spoons.

The bowl A of the spoon we generally make in the usual manner, but at the place where the handle is to be joined we form a recess, *c*, on the inner side to receive the handle, as seen in Fig. 1, or, if preferred, from the outside in. In the first case the handle will be affixed upon the inner side of the bowl; in the last it will be upon the outer side. That first described we prefer, as it in our opinion forms the most finished and perfect spoon.

Figure 3:
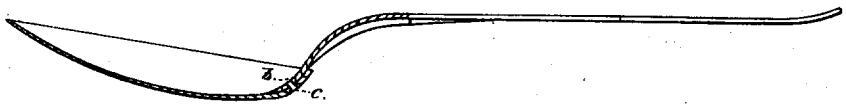

The handle B is formed as seen in Fig. 2, its lower end, *b*, corresponding to the depression *c* in the bowl. Both the bowl and handle are punched correspondingly to receive a rivet, *a*. When thus prepared the end *b* is set into the depression *c* in the bowl and there riveted, as seen in Fig. 3; but before so riveting, the surface of the two parts to be joined at the place of contact are tinned in the usual manner, after which, and riveting as aforesaid, the spoon is then to be tinned in the ordinary manner, which effects the soldering of the bowl and handle together, as is well known.

It will thus be seen that the handle has a bearing upon the bowl around the edge of the part *b* as well as upon the flat surface, and being made to fit into the depression of the bowl it cannot turn upon the rivet, even if the parts were not soldered together. The surfaces to be united by this construction are, however, greater, and the spoon consequently stronger, than by the common construction, and, further, the bowl being struck out of its regular curve at the point of uniting, the handle receives the strength due to the additional angles.

We have described this invention as an improvement in spoons, by which we wish to be understood as including ladles, skimmers, and like articles; and although we have illustrated the handle as set into the depression formed upon the inside of the bowl, it will be obvious, as before stated, that the depression may be reversed and the handle fixed upon the outside, but by so doing the desired contour of the interior of the bowl would be lost.

We have described the depression in the spoon as being made before the handle is placed therein, yet it is not necessary so to do, as the handle, with the rivet, may be placed upon the bowl and the depression made by striking the two together in a die prepared for the purpose. This operation is the simplest and cheapest, if not the best. Therefore,

Having thus fully described our invention, and different modes of attaining the desired result, we do not confine ourselves to any particular manner of so doing, but claim as new and useful and desire to secure by Letters Patent—

A spoon the bowl and handle of which are united substantially as described.

CHAS. PARKER.
RUSSELL B. PERKINS.

Witnesses:
JOHN W. MILES,
ALMERON MILES.